US008681852B2

(12) United States Patent
Huang et al.

(10) Patent No.: US 8,681,852 B2
(45) Date of Patent: Mar. 25, 2014

(54) COMMUNICATION DEVICE CAPABLE OF CHANNEL ESTIMATION AND METHOD THEREOF

(71) Applicant: Industrial Technology Research Institute, Hsinchu (TW)

(72) Inventors: Chuan-Yuan Huang, Kaohsiung (TW); Jia-Wei Liu, Taoyuan County (TW); Chorng-Ren Sheu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/669,323

(22) Filed: Nov. 5, 2012

(65) Prior Publication Data

US 2013/0170539 A1    Jul. 4, 2013

(30) Foreign Application Priority Data

Dec. 29, 2011  (TW) .............................. 100149467 A

(51) Int. Cl.
*H03H 7/30* (2006.01)
*H03H 7/40* (2006.01)
*H03K 5/159* (2006.01)

(52) U.S. Cl.
USPC ............................ 375/232; 370/203; 370/210

(58) Field of Classification Search
USPC ............................ 375/229–236; 370/203–211
See application file for complete search history.

(56) References Cited

U.S. PATENT DOCUMENTS

| 7,173,973 | B2 | 2/2007 | Borran et al. |
| 7,310,393 | B2 | 12/2007 | Sheu et al. |
| 7,394,865 | B2 | 7/2008 | Borran et al. |
| 7,830,994 | B2 | 11/2010 | Primo et al. |
| 2004/0264585 | A1 | 12/2004 | Borran et al. |
| 2005/0094740 | A1 | 5/2005 | Borran et al. |
| 2007/0298728 | A1 | 12/2007 | Imamura et al. |

(Continued)

FOREIGN PATENT DOCUMENTS

| TW | 201044827 | 12/2010 |
| TW | I339027 | 3/2011 |

OTHER PUBLICATIONS

Meng-Han Hsieh et al., "Channel Estimation for OFDM Systems Based on Comb-Type Pilot Arrangement in Frequency Selective Fading Channels," IEEE Transactions on Consumer Electronics, Feb. 1998, pp. 217-225, vol. 44, No. 1, IEEE, US.

(Continued)

*Primary Examiner* — Curtis Odom

(57) ABSTRACT

Communication methods and communication devices are disclosed. The communication method, performed by a communication device, including: receiving a time-domain OFDM symbol; converting the time-domain OFDM symbol to a frequency-domain OFDM symbol containing a plurality of pilot sub-carrier received signals; extracting the plurality of pilot sub-carrier received signals from the frequency-domain OFDM symbol; estimating a plurality of first frequency-domain channel average responses (CARs) of pilot sub-carriers according to the plurality of pilot sub-carrier received signals and a plurality of pilot sub-carrier transmitted signals; determining a pilot sub-carrier number parameter for a sub-carrier block according to a statistical information of channel delay; splitting all sub-carriers into a plurality of sub-carrier blocks according to the pilot sub-carrier number parameter; and estimating second frequency-domain CARs of all sub-carriers by performing weighting average and interpolation based on the first frequency-domain CARs of the pilot sub-carriers in all sub-carrier blocks.

12 Claims, 13 Drawing Sheets

(56) References Cited

U.S. PATENT DOCUMENTS

| | | |
|---|---|---|
| 2008/0095256 A1 | 4/2008 | Primo et al. |
| 2008/0095275 A1 | 4/2008 | Primo et al. |
| 2009/0175320 A1 | 7/2009 | Haustein et al. |
| 2010/0027608 A1 | 2/2010 | Priotti |
| 2010/0272018 A1 | 10/2010 | Furueda et al. |
| 2011/0103450 A1 | 5/2011 | Primo et al. |
| 2011/0103453 A1 | 5/2011 | Primo et al. |
| 2011/0150153 A1 | 6/2011 | Liu et al. |
| 2012/0014244 A1* | 1/2012 | Kishigami et al. ............ 370/209 |

OTHER PUBLICATIONS

Hussein Hijazi et al., "Polynomial Estimation of Time-Varying Multipath Gains with Intercarrier Interference Mitigation in OFDM Systems," IEEE Transactions on Vehicular Technology, Jan. 2009, pp. 140-151, vol. 58, No. 1, IEEE, US.

* cited by examiner

COMMUNICATION DEVICE CAPABLE OF CHANNEL ESTIMATION AND METHOD THEREOF

CROSS REFERENCE TO RELATED APPLICATIONS

This application claims priority of Taiwan Patent Application No. 100149467, filed on Dec. 29, 2011, and the entirety of which is incorporated by reference herein.

TECHNICAL FIELD

The present invention relates to communication systems, and in particular relates to a communication method and a communication device capable of channel estimation.

BACKGROUND

In wireless communications, a communication system usually employs a transmitter to send transmitted signals in the form of an electromagnetic wave to a receiver through a physical medium such as air. Typically, the received signal at the receiver contains distortions due to imperfect channel effects such as multipath reflection and fading effects. Orthogonal Frequency Division Multiplexing (OFDM) is an effective telecommunication technology to deal with the multipath reflection issue. In the OFDM system, the receiver only requires a simple one-tap equalizer to equalize the frequency-selective fading effect in the received signal caused by the multipath. As a consequence, the OFDM technology has become popular among all wired or wireless communication systems and digital broadcast applications, including Asymmetric Digital Subscriber Line (ADSL) systems, Power Line Communication (PLC) systems, Digital Audio Broadcasting (DAB) systems, wireless Local Area Network (WLAN) 802.11a/b/g/n systems, Digital TV Standards such as China Mobile Multimedia Broadcasting (CMMB), Digital Video Broadcasting-Terrestrial (DVB-T), and Digital Video Broadcasting-Handheld (DVB-H), Wi-Max IEEE 802.16e equipped with mobility equipment, and so on. Furthermore, fourth-generation (4G) wireless communication standards such as IEEE 802.16m and 3GPP (3rd Generation Partnership Project) Long Term Evolution-Advance (LTE-A) also employ the OFDM transmission technology.

High-speed motion is a feature adopted in 4G wireless communication standards such as the 802.16m and the 3GPP LTE-A. The device is capable of handling communication requirements under a high-speed environment with a motion speed as fast as 350 km/hr, even up to 500 km/hr. High-speed motion enabled communication devices have found application in broadband wireless telecommunication in a high-speed rail system. Rather than working in a static condition, the receiver in the OFDM system now moves at a high speed relative to the transmitter, consequently each useful OFDM symbol duration in the communication channel is no longer a fixed value, rendering a time-selective fading channel. Under high-speed motion, the Doppler effect causes the carrier frequency of an OFDM carrier to shift plus or minus 1 time of the Doppler frequency ($f_d$). The Doppler shift in the OFDM system may render an Inter-Carrier Interference (ICI) effect between sub-carriers in the received signal at the receiver, destroy the orthogonality and devastate system performance, resulting in an error floor effect.

The ICI effect may be reconstructed by a certain linear combination of transmitted data and channel variation response in a frequency domain. The more accurate the channel estimation is, including a channel average response and variation response, the more accurate the detected transmission data and the reconstruction of the ICI effect becomes, leading to a reduced ICI effect and increased performance of the OFDM system in the high-speed environment. However, the main challenge for channel estimation of the high-speed motion lies with the known signal, such as when the pilot sub-carrier signal has become distorted due to the ICI effect. Also, since the channel environments are different from the previous and subsequent symbol times, the traditional averaging technique in time domain for enhancing the accuracy of the channel average response is no longer applicable in high-speed conditions.

SUMMARY

According to one of the embodiments of the present disclosure, a communication method is disclosed, configured to handle channel estimation by a communication device, comprising: receiving a time-domain OFDM symbol; converting the time-domain OFDM symbol to a frequency-domain OFDM symbol, wherein the frequency-domain OFDM symbol comprises a plurality of pilot sub-carrier received signals and a plurality of data sub-carrier received signals; extracting the plurality of pilot sub-carrier received signals from the converted frequency-domain OFDM symbol; estimating a plurality of first frequency-domain channel average responses corresponding to a plurality of pilot sub-carriers according to the extracted plurality of pilot sub-carrier received signals and a plurality of pilot sub-carrier transmitted signals; determining a pilot sub-carrier number parameter for a sub-carrier block according to statistical information of channel delay; splitting all of the sub-carriers into a plurality of sub-carrier blocks according to the pilot sub-carrier number parameter; and estimating second frequency-domain channel average responses of all sub-carriers by performing weighting average and interpolation based on the first frequency-domain channel average responses of the pilot sub-carriers in all sub-carrier blocks.

According to one of the embodiments of the present disclosure a communication device is provided, capable of providing channel estimation, comprising a receiver module, a Fourier transform module, a pilot sub-carrier extraction module, a first frequency-domain channel average response estimation module, a sub-carrier block size determination module, a sub-carrier block split module, and a second frequency-domain channel average response estimation module. The receiver module is configured to receive a time-domain OFDM symbol. The Fourier transform module is configured to convert the time-domain OFDM symbol to a frequency-domain OFDM symbol, where the frequency-domain OFDM symbol comprises a plurality of pilot sub-carrier received signals and a plurality of data sub-carrier received signals. The pilot sub-carrier extraction module is configured to extract the plurality of pilot sub-carrier received signals from the converted frequency-domain OFDM symbol. The first frequency-domain channel response estimation module is configured to estimate a plurality of first frequency-domain channel average responses corresponding to a plurality of pilot sub-carriers according to the extracted plurality of pilot sub-carrier received signals and a plurality of pilot sub-carrier transmitted signals. The sub-carrier block size determination module is configured to determine a pilot sub-carrier number parameter for a sub-carrier block according to statistical information of channel delay. The sub-carrier block split module is configured to split all of the sub-carriers into a plurality of sub-carrier blocks according to the pilot sub-carrier number parameter. The second frequency-domain channel average response estimation module is configured to estimate the second frequency-domain channel average responses of all sub-carriers in the frequency-domain OFDM symbol according to the first frequency-domain channel average responses of the pilot sub-carriers in all sub-carrier blocks.

BRIEF DESCRIPTION OF DRAWINGS

The invention can be more fully understood by reading the subsequent detailed description and examples with references made to the accompanying drawings, wherein.

DETAILED DESCRIPTION

A detailed description is given in the following embodiments with reference to the accompanying drawings.

The embodiments of the invention utilize the property of communication channels having a large coherent bandwidth, applying carrier based Overlapped Multi-block Weighting Average technology to pilot carriers in a frequency domain to mitigate the effects of Inter-carrier Interference (ICI) and noise interference due to high-speed motion. It then employs interpolation techniques for estimating a Channel Average Response (CAR). Next, by applying a high-order time variant model, the channel average responses can be used in a specific linear combination in the frequency domain to estimate a Channel Variation Response (CVR), and further by implementing a simple symbol-based overlapped multi-block weighting average technology, in principle, the accuracy of the channel variation response could be significantly increased.

The interpolation techniques can be implemented by interpolation or extrapolation.

Figure 1:
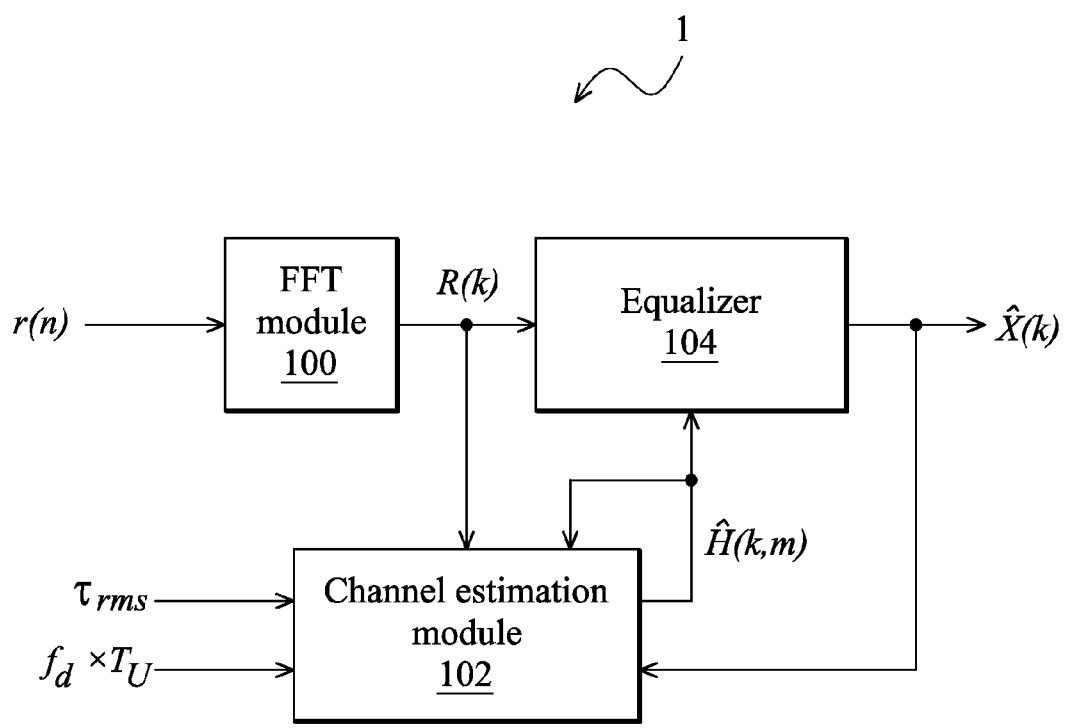
FIG. 1 is a block diagram of an OFDM receiver 1 according to an embodiment of the invention.

FIG. 1 is a block diagram of an OFDM receiver 1 according to an embodiment of the invention, comprising a Fast Fourier Transform (FFT) module 100, a channel estimation module 102, and an equalizer 104. The FFT module 100 is coupled to the channel estimation module 102, and further to the equalizer 104.

The FFT module 100 receives a received signal r(n) in the time domain, and utilizes the Fast Fourier Transform to transform the received signal r(n) in the time domain to a received signal R(k) in the frequency domain. The channel estimation module 102 estimates the channel average response and the channel variation response in the frequency domain according to the frequency-domain received signal R(k). The channel estimation module 102 performs a sub-carrier based overlapped multi-block weighting average technique to increase the accuracy of the CAR, then carries out the OFDM symbol based overlapped multi-block weighting average method to raise the accuracy of the CVR. In principle, the equalizer 104 receives the CAR and the CVR from the channel estimation module 102 to reduce ICI interference and channel effects as well as could increase the accuracy of the estimated transmitted signal.

Figure 2:
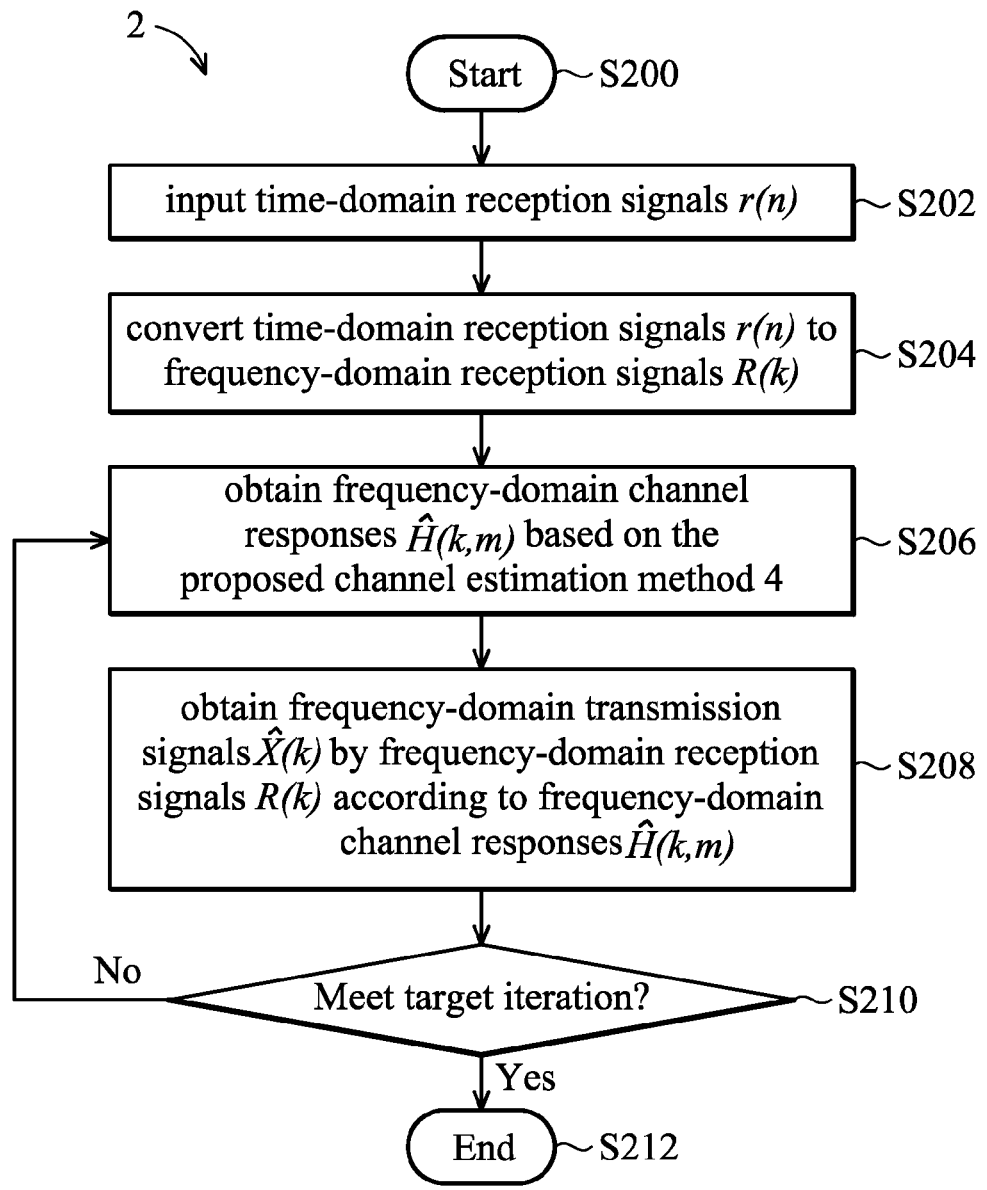
FIG. 2 is a flowchart of a signal reception method 2 according to an embodiment of the invention, incorporating the OFDM receiver 1 in FIG. 1.

FIG. 2 is a flowchart of a signal reception method 2 according to an embodiment of the invention, incorporating the OFDM receiver 1 in FIG. 1.

Upon starting up, the OFDM receiver 1 is initialized to detect and receive the time-domain received signal r(n) (S202), then the FFT module 100 converts the received signal r(n) in the time domain to the received signal R(k) in the frequency-domain using the FFT (S204). The frequency-domain received signal R(k) may be expressed by Eq. (1).

$$R(k) = X(k)H(k,k) + \underbrace{\sum_{m=0, m \neq k}^{N-1} X(m)H(k,m)}_{ICI\ terms} + \underbrace{W(k)}_{noise\ term} \qquad \text{Eq. (1)}$$

Where X(k) is the frequency-domain transmitted signal, H(k,m) is the channel response in the frequency domain, W(k) is additive white Gaussian noise (AWGN) in the frequency domain, and k,m are sub-carrier indexes Next, the channel estimation module 102 applies the proposed channel estimation method 4 to obtain a frequency-domain channel response Ĥ(k,m) (S206), the equalizer 104 performs channel effect compensation to the received signal R(k) by the channel response Ĥ(k,m) to obtain an estimated transmitted signal X̂(k) in a frequency domain (S208). The signal reception method 2 then determines whether a target number of iterations has met (S210). If not, the signal reception method 2 uses the transmitted signal X̂(k) and channel response Ĥ(k,m) obtained in the immediately previous iteration to perform another channel estimation to obtain a more accurate channel response in the frequency domain (S206), obtain another, more accurate estimated transmitted signal in the frequency domain by the equalizer 104, and the iteration continues until the target number of iterations is met (S212). The channel estimation method used by the channel estimation module 102 can be explained in two parts, the first part is channel average response estimation which is used to provide a frequency-domain channel average response Ĥ(k,k), and the second part is channel variation response estimation which is to supply a frequency-domain channel variation response Ĥ(k,m)$|_{m \neq k}$. Ĥ(k,m)$|_{m \neq k}$ is referred to as Ĥ(k,m), where m≠k.

Figure 3:
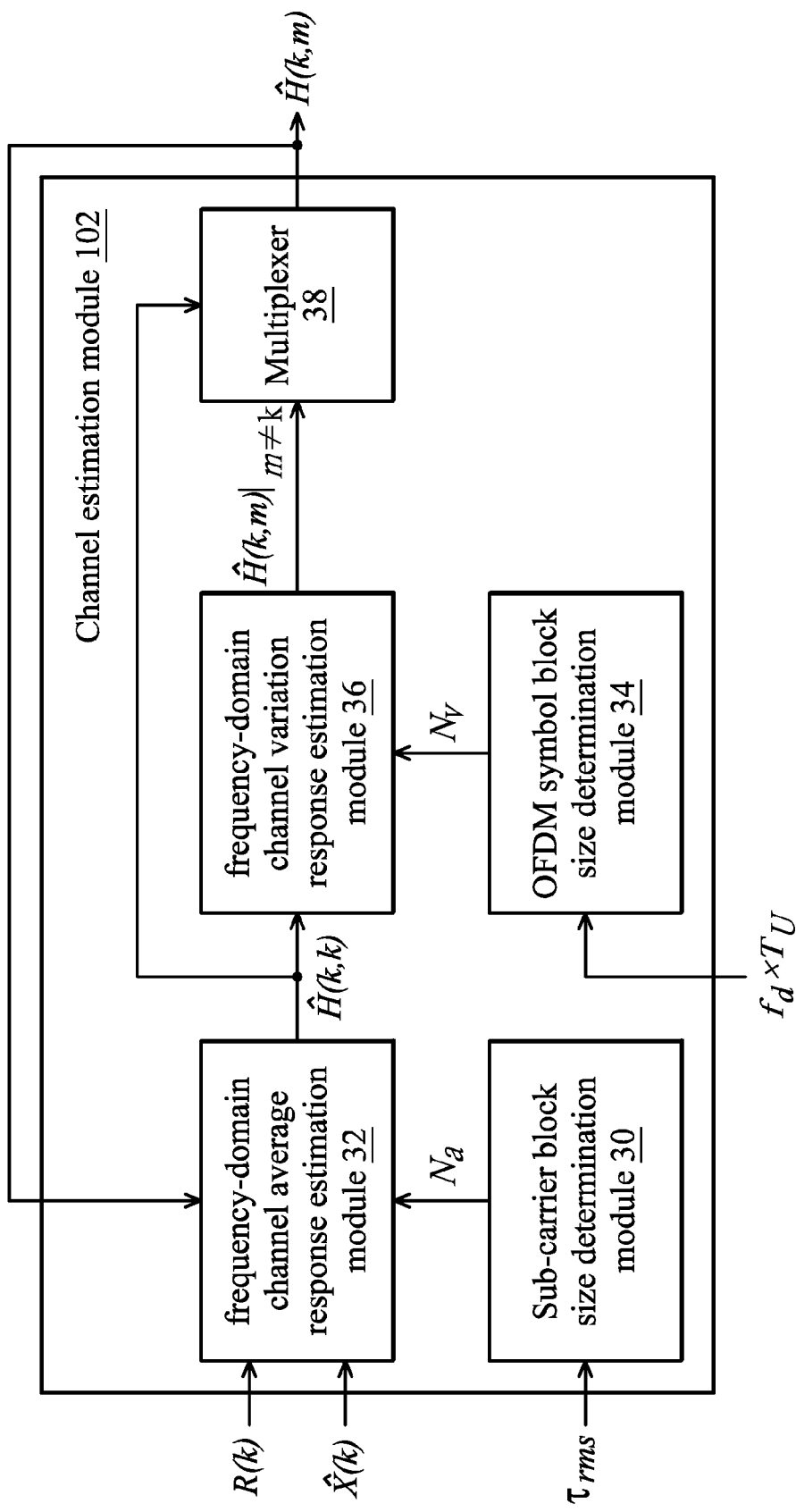
FIG. 3 is a block diagram of the channel estimation module 102 in the OFDM receiver 1 according to an embodiment of the invention.

FIG. 3 is a block diagram of the channel estimation module 102 in the OFDM receiver 1 according to an embodiment of the invention, comprising a sub-carrier block size determination module 30, a frequency-domain channel average response estimation module 32, an OFDM symbol block size determination module 34, a frequency-domain channel variation response estimation module 36, and a multiplexer 38. The sub-carrier block size determination module 30 is coupled to the frequency-domain channel average response estimation module 32, then to the channel variation response module 36 and the multiplexer 38. The sub-carrier block size determination module 30 is coupled to the frequency-domain channel average response estimation module 32, and subsequently to the frequency-domain channel variation response estimation module 36 and the multiplexer 38. The OFDM symbol block size determination module 34 is coupled to the frequency-domain channel variation response estimation module 36, and subsequently to the multiplexer 38.

The sub-carrier block size determination module 30 determines a pilot sub-carrier number parameter $N_a$ of a sub-carrier block based on statistical information of channel delay, such as a Root Mean Square (RMS) statistical estimation $\tau_{RMS}$. The RMS statistical estimation $\tau_{RMS}$ for channel delay may be computed by using Eq. (2):

$$\tau_{rms} = E(\tau^2) - \{E(\tau)\}^2 \quad \text{Eq. (2)}$$

Where $$E(\tau^j) = \sum_{l=0}^{L-1} prob(\tau_l)\tau_l^j,$$

$$prob(\tau_l) = \sqrt{\text{power}(l)} \Big/ \sum_{l=0}^{L-1} \sqrt{\text{power}(l)},$$

and power(l) is power for the $i^{th}$ path. The sub-carrier block size determination module 30 may determine the pilot sub-carrier number parameter $N_a$ of the sub-carrier block by a look-up table. The frequency-domain channel average response estimation module 32 can produce the frequency-domain channel average response Ĥ(k,k) according to the frequency-domain received signal R(k) and the pilot sub-carrier number parameter $N_a$ of the sub-carrier block.

The OFDM symbol block size determination module 34 can determine an OFDM symbol number parameter $N_v$ of an OFDM symbol block according to a normalized Doppler frequency. The frequency-domain channel variation response estimation module 36 may calculate the frequency-domain channel variation response Ĥ(k,m)$|_{m \neq k}$ for each OFDM symbol based on the frequency-domain channel average response Ĥ(k,k) for each sub-carrier and the OFDM symbol number parameter $N_v$ of the OFDM symbol block. The multiplexer 38 can receive the channel average response Ĥ(k,k) and the channel variation response Ĥ(k,m)$|_{m \neq k}$ and select one therefrom for outputting to the equalizer 104, thereby reducing or removing the ICI channel effect in the received signal R(k) in the frequency domain.

Figure 4:
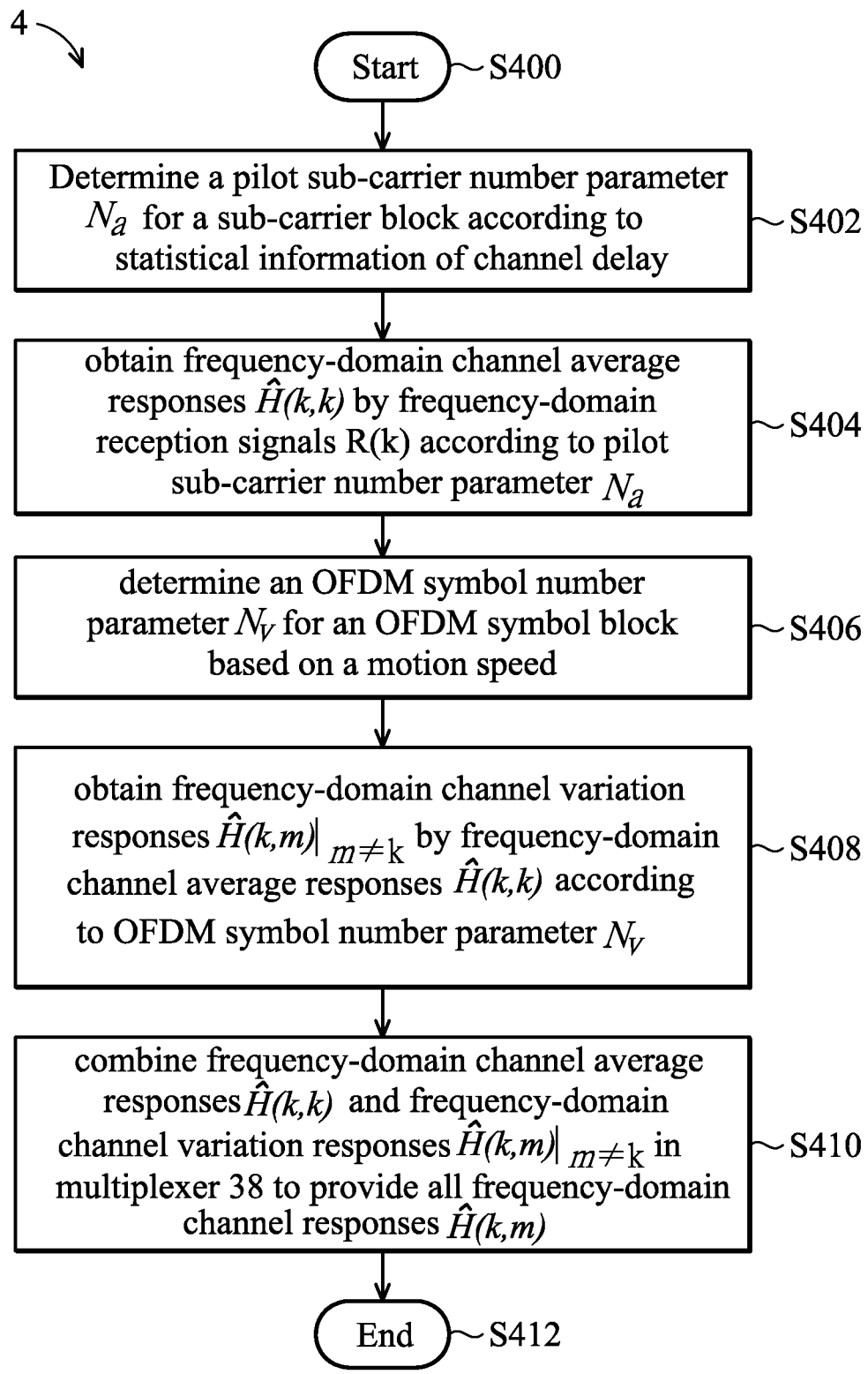
FIG. 4 is a flowchart of a channel estimation method 4 according to an embodiment of the invention, incorporating the channel estimation module 102 in FIG. 3.

FIG. 4 is a flowchart of a channel estimation method 4 according to an embodiment of the invention, incorporating the channel estimation module 102 in FIG. 3.

After the channel estimation method 4 is initialized, the channel estimation module 102 is ready to estimate the channel response (S400). The sub-carrier block size determination module 30 can receive the statistical information of the channel delay to produce the pilot sub-carrier number parameter $N_a$ of the sub-carrier block (S402). When the statistical information is the RMS value $\tau_{RMS}$ of the channel delay, the pilot sub-carrier number parameter $N_a$ of the sub-carrier block can be obtained by consulting Tables (a) and (b):

TABLE (a)

| $\tau_{rms}$ | ½ $T_s$ | 3/2 $T_s$ | 5/2 $T_s$ | 7/2 $T_s$ |
|---|---|---|---|---|
| $N_a$ | 8 | 4 | 2 | 2 |

TABLE (b)

| | $\tau_{rms}$ | | | | | |
|---|---|---|---|---|---|---|
| | ½ $T_s$ | 3/2 $T_s$ | 5/2 $T_s$ | 7/2 $T_s$ | 9/2 $T_s$ | 11/2 $T_s$ | 13/2 $T_s$ |
| $N_a$ | 22 | 9 | 6 | 5 | 4 | 3 | 3 |

Where Table (a) is adapted by the frequency-domain channel average response estimation module to implement a first-order interpolation, and Table (b) is adapted by the frequency-domain channel average response estimation module to implement a second-order interpolation. The frequency-domain channel average response estimation module 32 can group all pilot sub-carriers, put every consecutive $N_a$ number of the pilot sub-carriers into one sub-carrier block, wherein each block may overlap with another, and each adjacent block is separated by 1 pilot sub-carrier. The frequency-domain channel average response estimation module 32 can perform an average and interpolation operations on the grouped frequency-domain channel average responses Ĥ($k_p,k_p$) to generate the frequency-domain channel average responses Ĥ(k,k) for all of the sub-carriers (S404). The average operation may be a weighting average operation.

The OFDM symbol block size determination module 34 can determine the OFDM symbol number parameter $N_v$ of the OFDM symbol block based on the normalized Doppler frequency (hereinafter referred to as NDF) (S406). If the NDF is less than or equal to 7.5%, 2 is selected for the $N_v$; if 7.5%<NDF≤10%, 3 is selected for the $N_v$. The channel variation response module 36 can group for all OFDM symbols based on the OFDM symbol number parameter $N_v$ of the OFDM symbol block, so that each consecutive $N_v$ number of OFDM symbols are grouped into one single OFDM symbol block. Each OFDM symbol block may overlap with another, and each adjacent block is separated by 1 OFDM symbol. The frequency-domain channel variation response estimation module 36 can apply a higher-order time variant channel model and a mathematical analysis, with the higher-order being an order of $N_v-1$ to the frequency-domain channel average responses of all OFDM symbols in each block by performing a linear combination and weighting average on the overlapped symbols to compute the frequency-domain channel variation response $\hat{H}(k,m)|_{m \neq k}$ for all OFDM symbols (S408). All frequency-domain channel average responses $\hat{H}(k,k)$ and frequency-domain channel variation responses $\hat{H}(k,m)|_{m \neq k}$ are forwarded to the multiplexer 38 to carry out a combination to work out all of the channel responses $\hat{H}(k,m)$ (S410). Then the channel estimation method 4 is completed and exited (S412).

Figure 5:
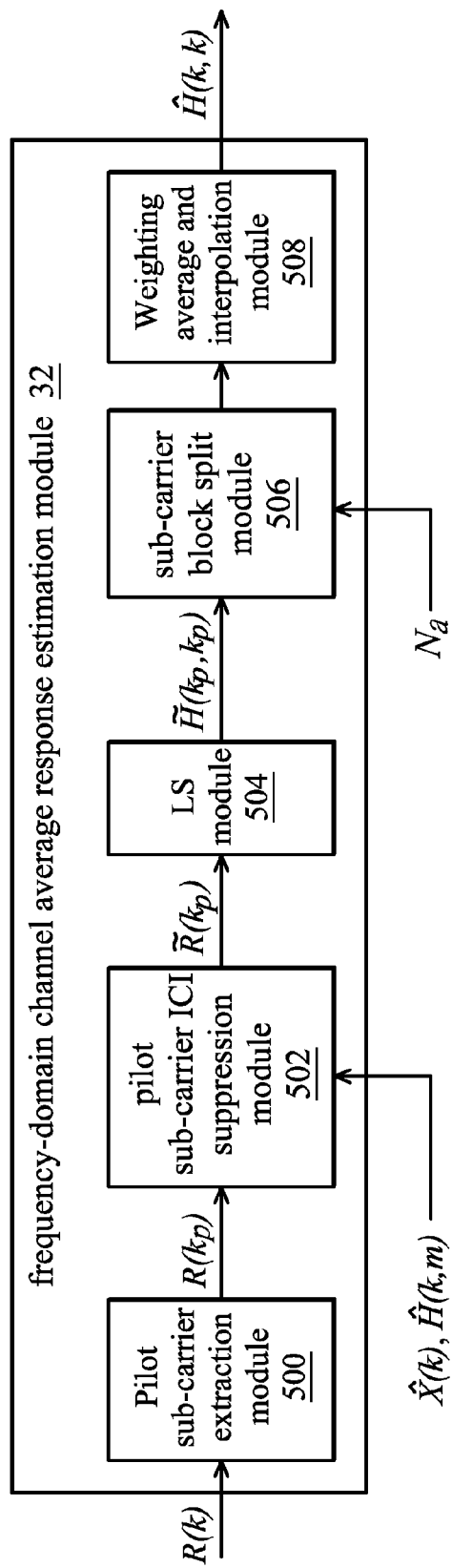
FIG. 5 is block diagram of a frequency-domain channel average response estimation module 32 in the channel estimation module 102 according to an embodiment of the invention.

FIG. 5 is block diagram of a frequency-domain channel average response estimation module 32 in the channel estimation module 102 according to an embodiment of the invention, comprising a pilot sub-carrier extraction module 500, a pilot sub-carrier ICI suppression module 502, an LS module 504, a sub-carrier block split module 506, and a weighting average and interpolation module 508. The pilot sub-carrier extraction module 500 is coupled to the pilot sub-carrier ICI suppression module 502, the LS module 504, the sub-carrier block split module 506, and then to the weighting average and interpolation module 508.

The pilot sub-carrier extraction module 500 can extract the pilot sub-carrier received signal $R(k_p)$ from the received signal $R(k)$ in the frequency domain. The pilot sub-carrier ICI suppression module 502 can conduct a preliminary suppression on the ICI component for the pilot sub-carrier received signal $R(k_p)$ according to the frequency-domain channel response $\hat{H}(k,m)$ and frequency-domain transmitted signal $\hat{X}(k)$ from the previous iteration, as expressed by Eq. (3):

$$\tilde{R}(k_p) = R(k_p) - \sum_{m=0, m \neq k_p}^{N-1} \hat{X}(m)\hat{H}(k_p, m) \quad \text{Eq. (3)}$$

For the first iteration, there is no estimated channel response $\hat{H}(k,m)$ and the estimated transmitted signal $\hat{X}(k)$, thus the pilot sub-carrier ICI suppression module 502 can let the pilot sub-carrier received signal $R(k_p)$ pass without any processing in the first iteration. The least square (LS) module 504 can estimate the frequency-domain channel average responses $\tilde{H}(k_p,k_p)$ of the pilot sub-carrier according to Eq. (4). The frequency-domain channel average response $\tilde{H}(k_p, k_p)$ is referred to as the first frequency-domain channel average response. Eq. (4) is expressed by:

$$\tilde{H}(k_p,k_p) = \tilde{R}(k_p)/\hat{X}(k_p) \quad \text{Eq. (4)}$$

The sub-carrier block split module 506 can group all pilot sub-carriers, put every consecutive $N_a$ number of the pilot sub-carriers into one sub-carrier block, each block may overlap with another, and each adjacent block is separated by 1 pilot sub-carrier. The weighting average and interpolation module 508 can perform averaging and interpolation on all frequency-domain channel average responses $\tilde{H}(k_p,k_p)$ of the pilot sub-carriers in the sub-carrier block, thereby producing frequency-domain channel average responses $\hat{H}(k,k)$ for all sub-carriers. The $\hat{H}(k,k)$ can be referred to as the second frequency-domain channel average response. The weighting average and interpolation module 508 can compute the weighting average and interpolation operations, which can be classified according to "weighting average then interpolating" or "interpolating then weighting average" types. FIGS. 7A-7C and 8A-8C illustrate devices and methods for the two types of weighting average and interpolation operations.

Figure 6:
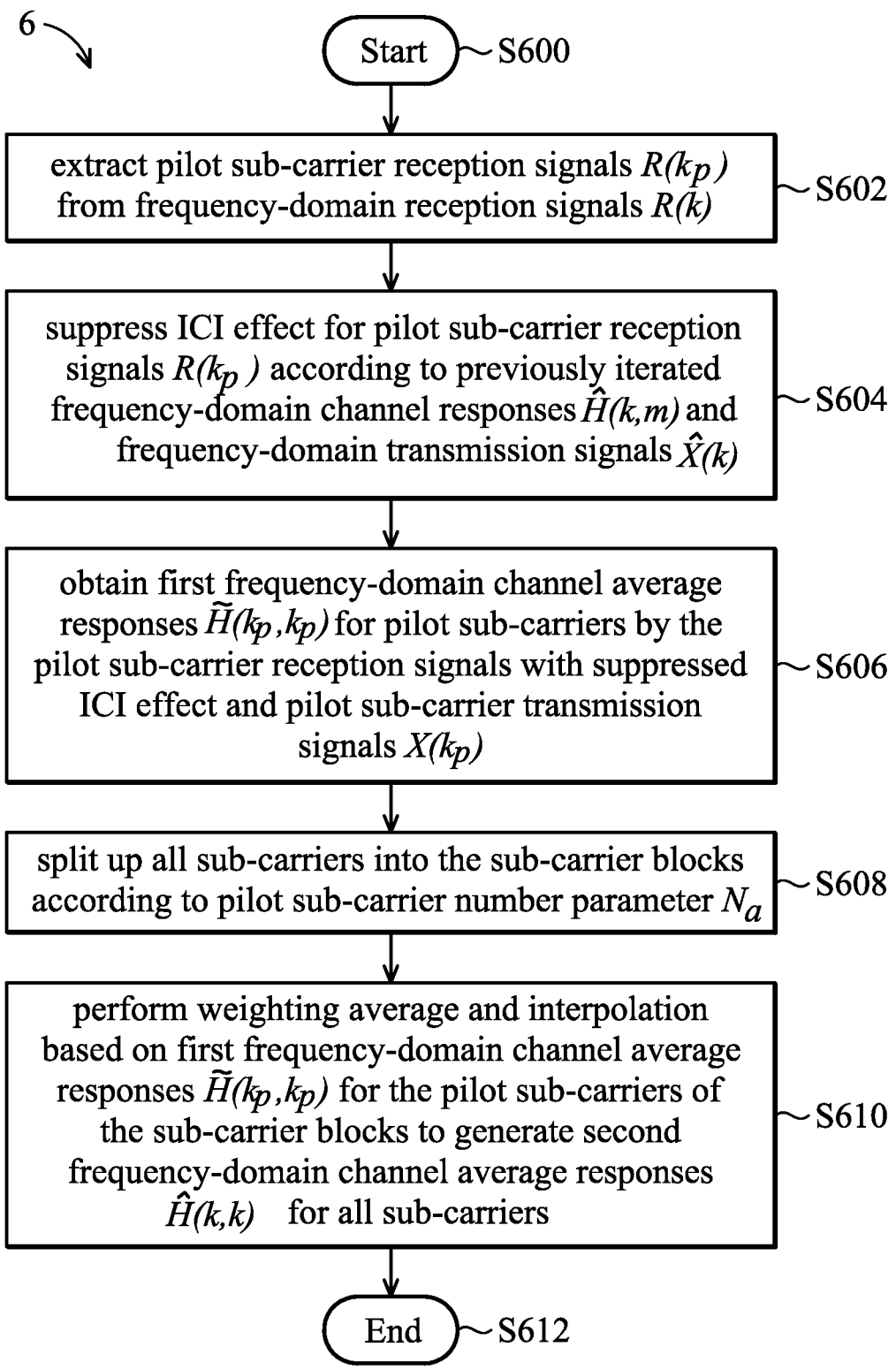
FIG. 6 is a flowchart of a frequency-domain channel average response estimation method 6 according to an embodiment of the invention, incorporating the frequency-domain channel average response estimation module 32 in FIG. 5.

FIG. 6 is a flowchart of a frequency-domain channel average response estimation method 6 according to an embodiment of the invention, incorporating the frequency-domain channel average response estimation module 32 in FIG. 5.

Upon startup of the frequency-domain channel average response estimation method 6, the frequency-domain channel average response estimation module 32 initializes all parameters and devices for the frequency-domain channel average response estimation method 6 (S600). In Step S602, the pilot sub-carrier extraction module 500 extracts all pilot sub-carrier received signals $R(k_p)$ from the frequency-domain received signal $R(k)$ for estimating the channel average response. When it is not the first iteration, the pilot sub-carrier ICI suppression module 502 can conduct an initial suppression to the ICI component in the pilot sub-carrier received signal $R(k_p)$ according to the frequency-domain channel response $\hat{H}(k,m)$ and the frequency-domain transmitted signal $\hat{X}(k)$ from the previous iteration (S604). The LS module 504 can then estimate the frequency-domain channel average response $\tilde{H}(k_p,k_p)$ for all pilot sub-carriers based on Eq. (4) (S606). The sub-carrier block split module 506 can receive the pilot sub-carrier number $N_a$ of the sub-carrier block, and it assigns each consecutive parameter $N_a$ number of pilot sub-carriers to a sub-carrier block, wherein each block may overlap with another, and each adjacent block is spaced by 1 pilot sub-carrier (S608). Lastly, the weighting average and interpolation module 508 performs the averaging and interpolation operation to the frequency-domain channel average responses $\tilde{H}(k_p,k_p)$ of pilot sub-carriers in all sub-carrier blocks, thereby producing the frequency-domain channel average responses $\hat{H}(k,k)$ for all sub-carriers (S610). The frequency-domain channel average response estimation method 6 is then completed and exited (S612).

Figure 7A:
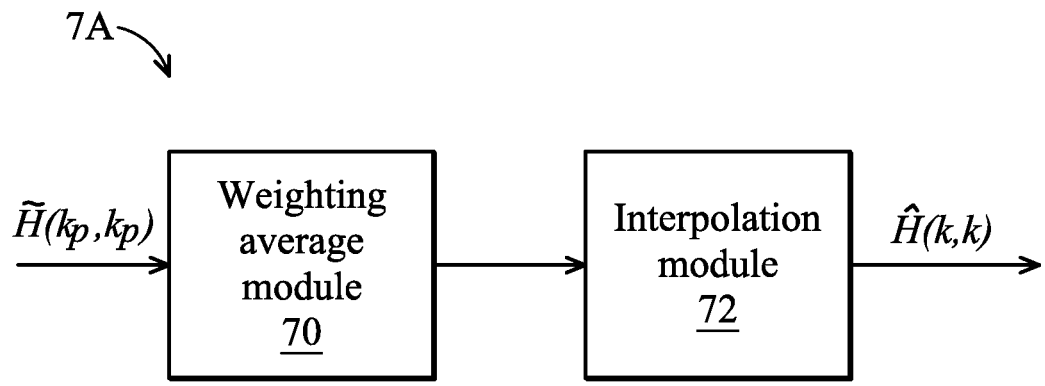
FIG. 7A is a block diagram of a weighting average then interpolation module 7A according to an embodiment of the invention, adaptable in the frequency-domain channel average response estimation module 32, and implemented in the weighting average and interpolation module 508.

FIG. 7A is a block diagram of a weighting average then interpolation module 7A according to an embodiment of the invention, adaptable in the frequency-domain channel average response estimation module 32, and implemented in the weighting average and interpolation module 508. The weighting average then interpolation module 7A includes a weighting average module 70 and an interpolation module 72 coupled thereto. The weighting average module 70 can receive frequency-domain channel average responses $\tilde{H}(k_p, k_p)$ for the consecutive pilot sub-carrier in the sub-carrier block, and perform a weighting average on the received data to produce a weighting average value. The interpolation module 72 then performs interpolation to all weighting average values to compute frequency-domain channel average responses $\hat{H}(k,k)$ for all sub-carriers.

Figure 7B:
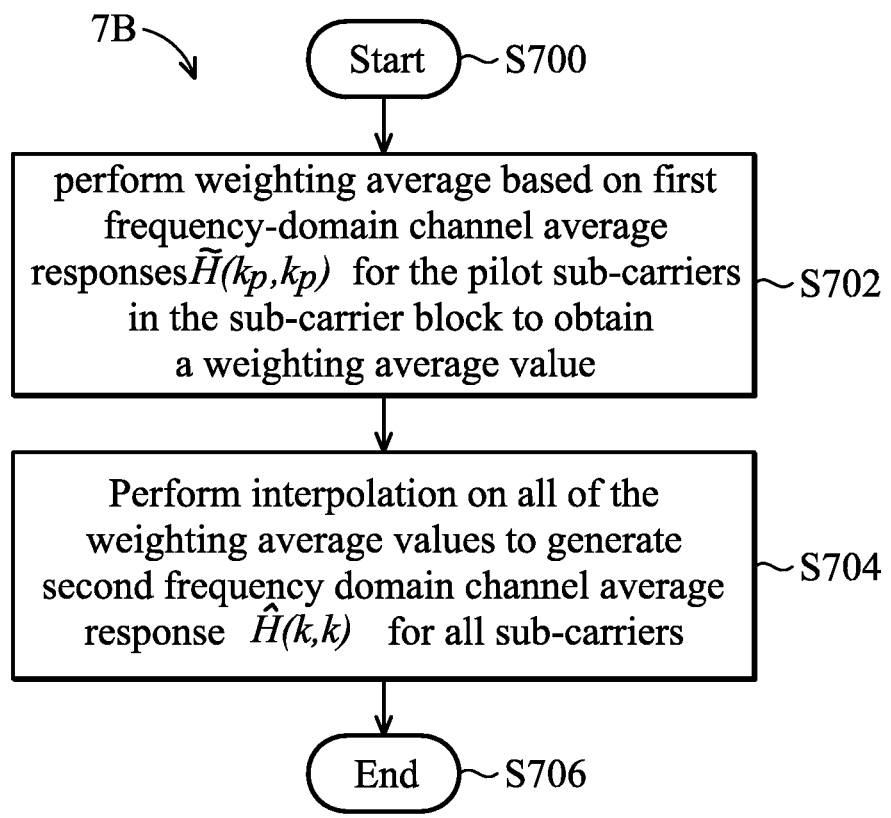
FIG. 7B is a flowchart of a weighting average then interpolation method 7B according to an embodiment of the invention, incorporating the weighting average then interpolation module 7A.
Figure 7C:
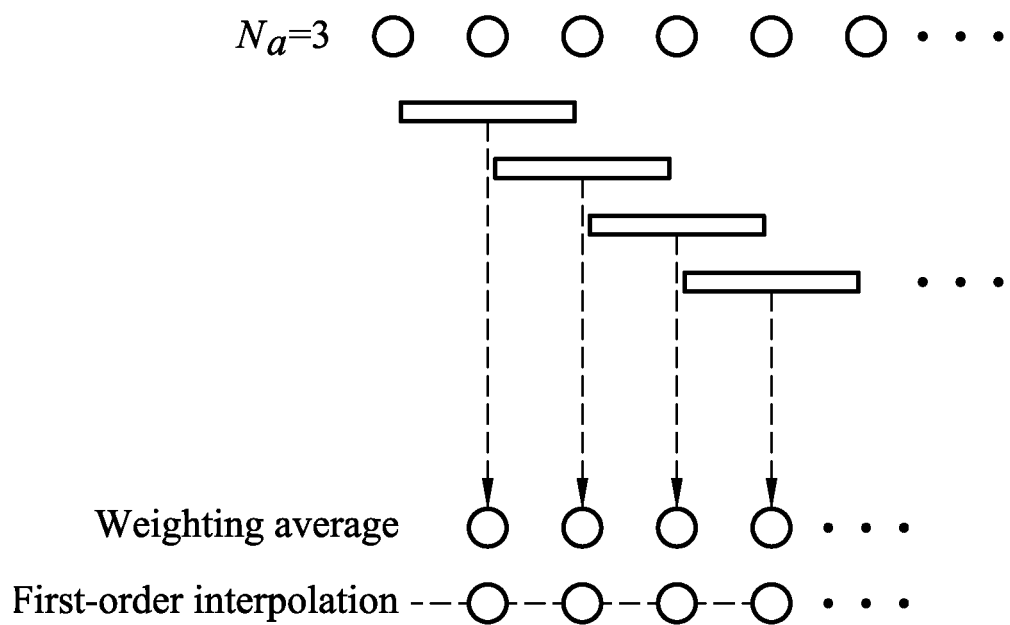
FIG. 7C illustrates the operations of the weighting average then interpolation method 7B according to an embodiment of the invention.

FIG. 7B is a flowchart of a weighting average then interpolation method 7B according to an embodiment of the invention, incorporating the weighting average then interpolation module 7A. FIG. 7C illustrates the operations of the weighting average then interpolation method 7B according to an embodiment of the invention.

Upon startup of the weighting average then interpolation method 7B, the weighting average then interpolation module 7A initializes all parameters and devices used therein (S700). The weighting average module 70 can receive frequency-domain channel average responses $\tilde{H}(k_p,k_p)$ for the pilot sub-carrier in the sub-carrier block and performs weighting averages on the received frequency-domain channel average responses $\tilde{H}(k_p,k_p)$ to obtain the new frequency-domain channel average response for the center sub-carrier of the sub-carrier block (S702). Referring to FIG. 7C, the pilot sub-carrier number parameter $N_a$ of the sub-carrier block is 3, hence the weighting average module 70 performs a weighting average on the frequency-domain channel average responses $\tilde{H}(k_p,k_p)$ of the 3 pilot sub-carriers in each sub-carrier block. The weighting average module 70 may assign the same weighting to the frequency-domain channel average responses $\tilde{H}(k_p,k_p)$ of the 3 pilot sub-carriers, or assign a larger weighting for one of the frequency-domain channel average responses $\tilde{H}(k_p,k_p)$ in the 3 pilot sub-carriers. Now referring back to FIG. 7B, the interpolation module 72 performs interpolation to all weighting average values to calculate the frequency-domain channel average responses $\hat{H}(k,k)$ for all sub-carriers (S704). FIG. 7C shows the interpolation module 72 utilizing the new frequency-domain channel average responses for the center sub-carriers of all blocks to carry out the first-order interpolation, thereby obtaining the frequency-domain channel average responses $\hat{H}(k,k)$ for all sub-carriers in the OFDM symbol.

Figure 8A:
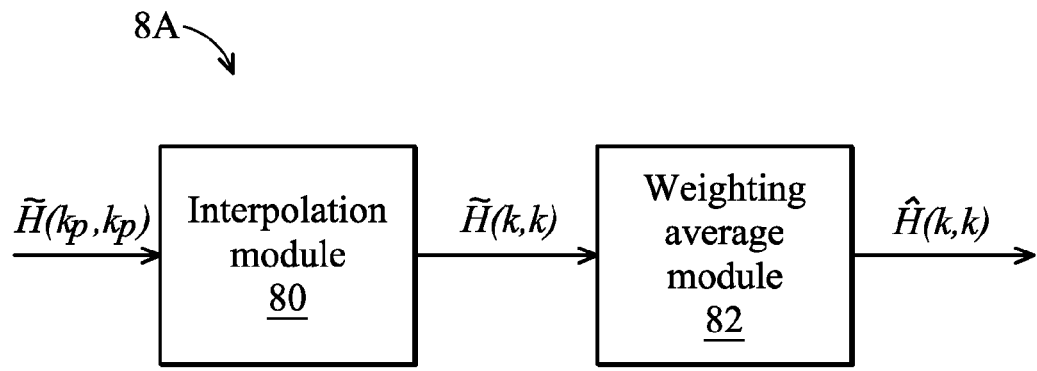
FIG. 8A is a block diagram of an interpolation then weighting average module 8A according to an embodiment of the invention, adaptable in the frequency-domain channel average response estimation module 32, and implemented in the weighting average and interpolation module 508.

FIG. 8A is a block diagram of an interpolation then weighting average module 8A according to an embodiment of the invention, adaptable in the frequency-domain channel average response estimation module 32, and implemented in the weighting average and interpolation module 508. The interpolation then weighting average module 8A includes an interpolation module 80 and a weighting average module 82 coupled thereto. The interpolation module 80 can perform interpolation to the frequency-domain channel average responses $\tilde{H}(k_p,k_p)$ of all pilot sub-carriers in each sub-carrier block to derive the frequency-domain channel average responses $\tilde{H}(k,k)$ of all sub-carriers in each sub-carrier block. The weighting average module 82 can receive the frequency-domain channel average responses $\tilde{H}(k,k)$ of all sub-carriers for all sub-carrier blocks, and perform a weighting average on overlapped parts of the blocks to obtain the frequency-domain channel average responses $\hat{H}(k,k)$ of all sub-carriers in the OFDM symbol.

Figure 8B:
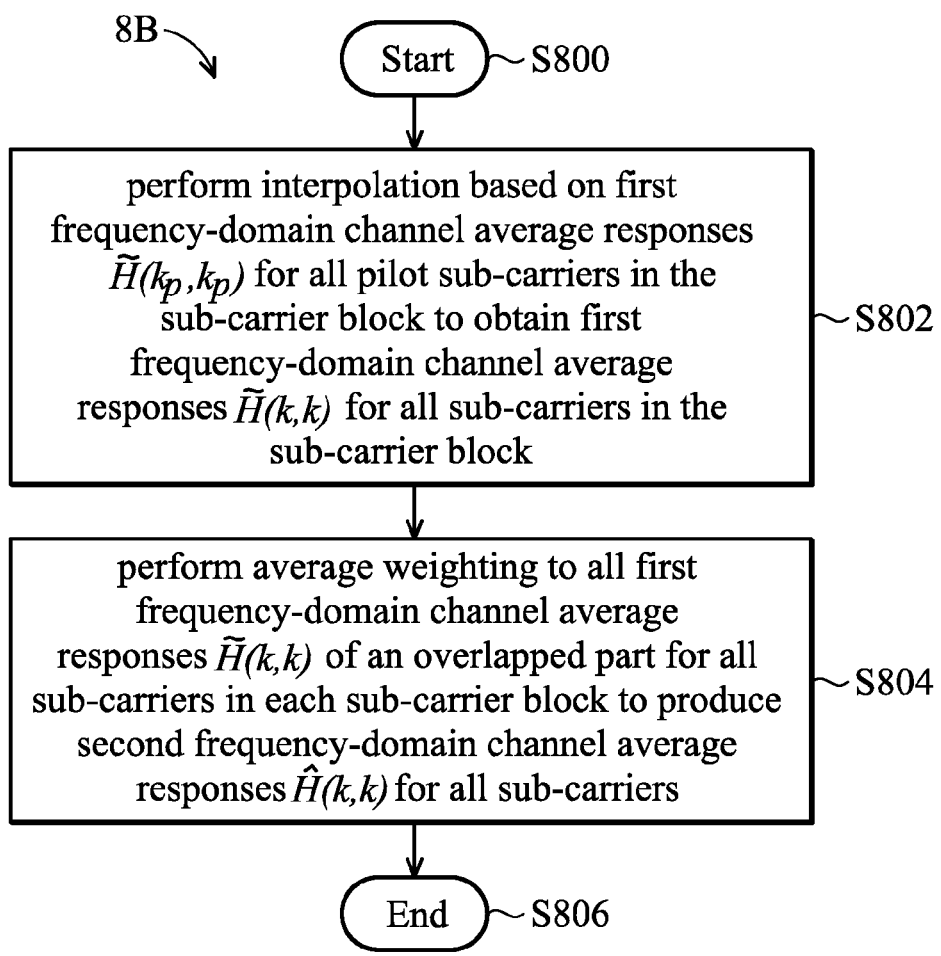
FIG. 8B is a flowchart of an interpolation then weighting average method 8B according to an embodiment of the invention, incorporating the interpolation then weighting average module 8A.
Figure 8C:
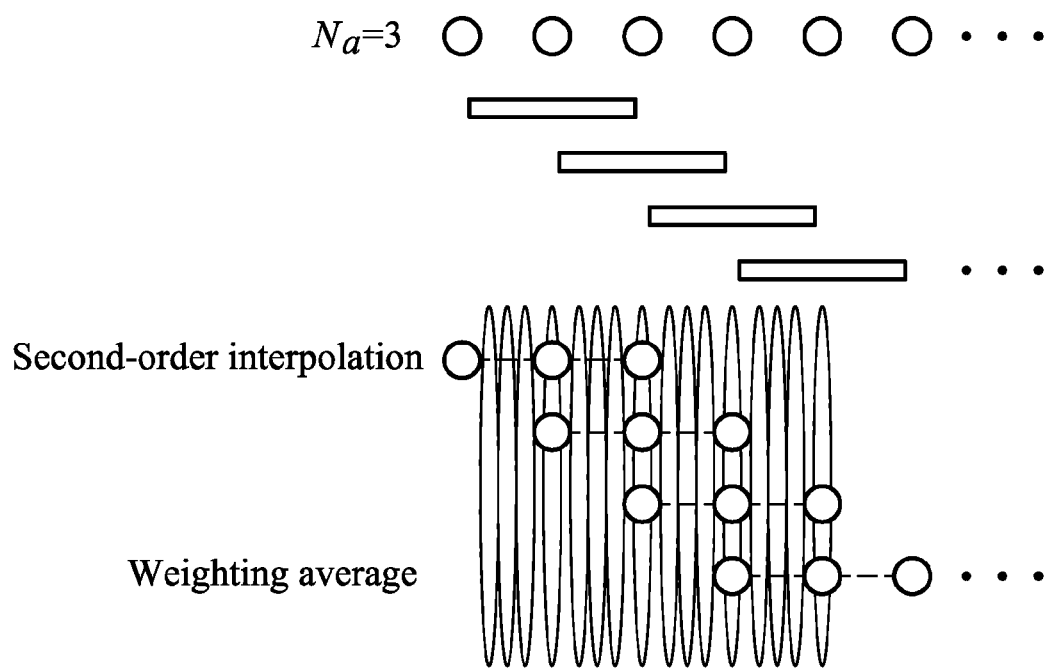
FIG. 8C illustrates the operations of the interpolation then weighting average method 8B according to an embodiment of the invention.

FIG. 8B is a flowchart of an interpolation then weighting average method 8B according to an embodiment of the invention, incorporating the interpolation then weighting average module 8A. FIG. 8C illustrates the operations of the interpolation then weighting average method 8B according to an embodiment of the invention.

Upon startup, the interpolation then weighting average module 8A initializes all parameters and devices used therein (S800). The interpolation module 80 can perform interpolation to frequency-domain channel average responses $\tilde{H}(k_p,k_p)$ of all pilot sub-carriers in each sub-carrier block to derive the frequency-domain channel average responses $\tilde{H}(k,k)$ of all sub-carriers in each sub-carrier block (S802). The weighting average module 82 can receive the frequency-domain channel average responses $\tilde{H}(k,k)$ of all sub-carriers for all sub-carrier blocks, and perform a weighting average on the plurality of frequency-domain channel average responses $\tilde{H}(k,k)$ corresponding to the same sub-carriers in each sub-carrier block to obtain the frequency-domain channel average responses $\hat{H}(k,k)$ of all sub-carriers in the OFDM symbol (S804).

Figure 9:
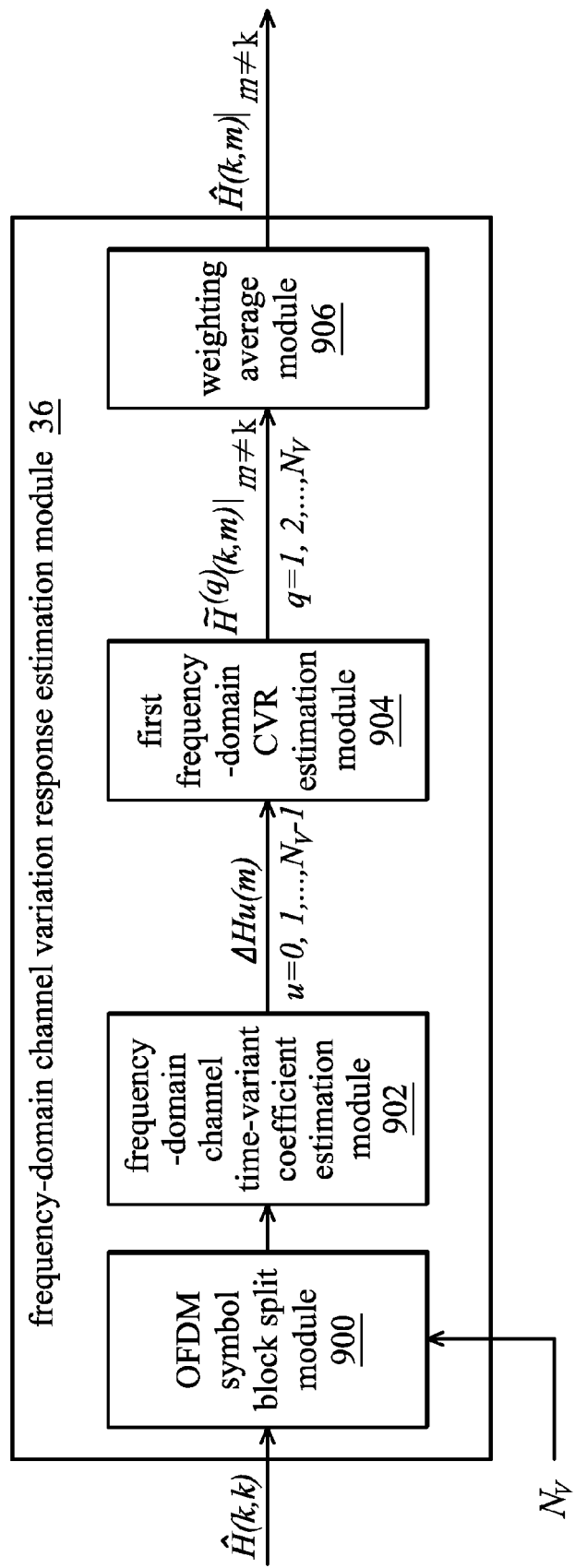
FIG. 9 is a block diagram of a frequency-domain channel variation response estimation module 36 according to an embodiment of the invention, adapted for the channel estimation module 102.

FIG. 9 is a block diagram of a frequency-domain channel variation response estimation module 36 according to an embodiment of the invention, adapted for the channel estimation module 102, including an OFDM symbol block split module 900, a frequency-domain channel time-variant coefficient estimation module 902, a first frequency-domain channel variation response estimation module 904, and a weighting average module 906. The OFDM symbol block split module 900 is coupled to the frequency-domain channel time-variant coefficient estimation module 902, the first frequency-domain channel variation response estimation module 904, and then to the weighting average module 906.

The OFDM symbol block split module 900 can receive the OFDM symbol number parameter $N_v$ for the OFDM symbol block and the frequency-domain channel average response $\hat{H}(k,k)$, and group consecutive $N_v$ number of OFDM symbols into one block, wherein each block may overlap with another, and adjacent blocks are spaced by 1 OFDM symbol. The $N_v$ is associated with the normalized Doppler frequency by a relationship of $f_d \times T_U$, where $f_d$ is the Doppler frequency and $T_U$ is OFDM usable symbol duration. When $5\% < f_d \times T_U \le 7.5\%$, $N_v$ can be selected as 2; when $7.5\% < f_d \times T_U \le 10\%$, $N_v$ can be selected as 3. The frequency-domain channel time-variant coefficient estimation module 902 can apply a higher order time-variant channel model with an order of $(N_v-1)$ and the corresponding mathematical analysis to the frequency-domain channel average responses $\hat{H}(k,k)$ of all $N_v$ number of OFDM in each block, and calculate the frequency-domain channel time-variant coefficient $\Delta \hat{H}(m)$ for each block based on a simple linear combination, where $u=0, 1, \ldots, N_v-1$. The first frequency-domain channel variation response estimation module 904 can utilize the frequency-domain channel time-variant coefficient for each block to calculate the frequency-domain channel variation responses $\tilde{H}^{(q)}(k,m)|_{m \ne k}$ of all $N_v$ number of OFDM symbols in each block based on a specific linear combination, where $q=1, 2, \ldots, N_v$. $\tilde{H}^{(q)}(k,m)|_{m \ne k}$ is referred to as the first frequency-domain channel variation response. The weighting average module 906 can perform the weighting average operation on the overlapped parts of all blocks to determine frequency-domain channel variation responses $\hat{H}(k,m)|_{m \ne k}$ for all OFDM symbols. $\hat{H}(k,m)|_{m \ne k}$ is referred to as the second frequency-domain channel variation response.

Figure 10A:
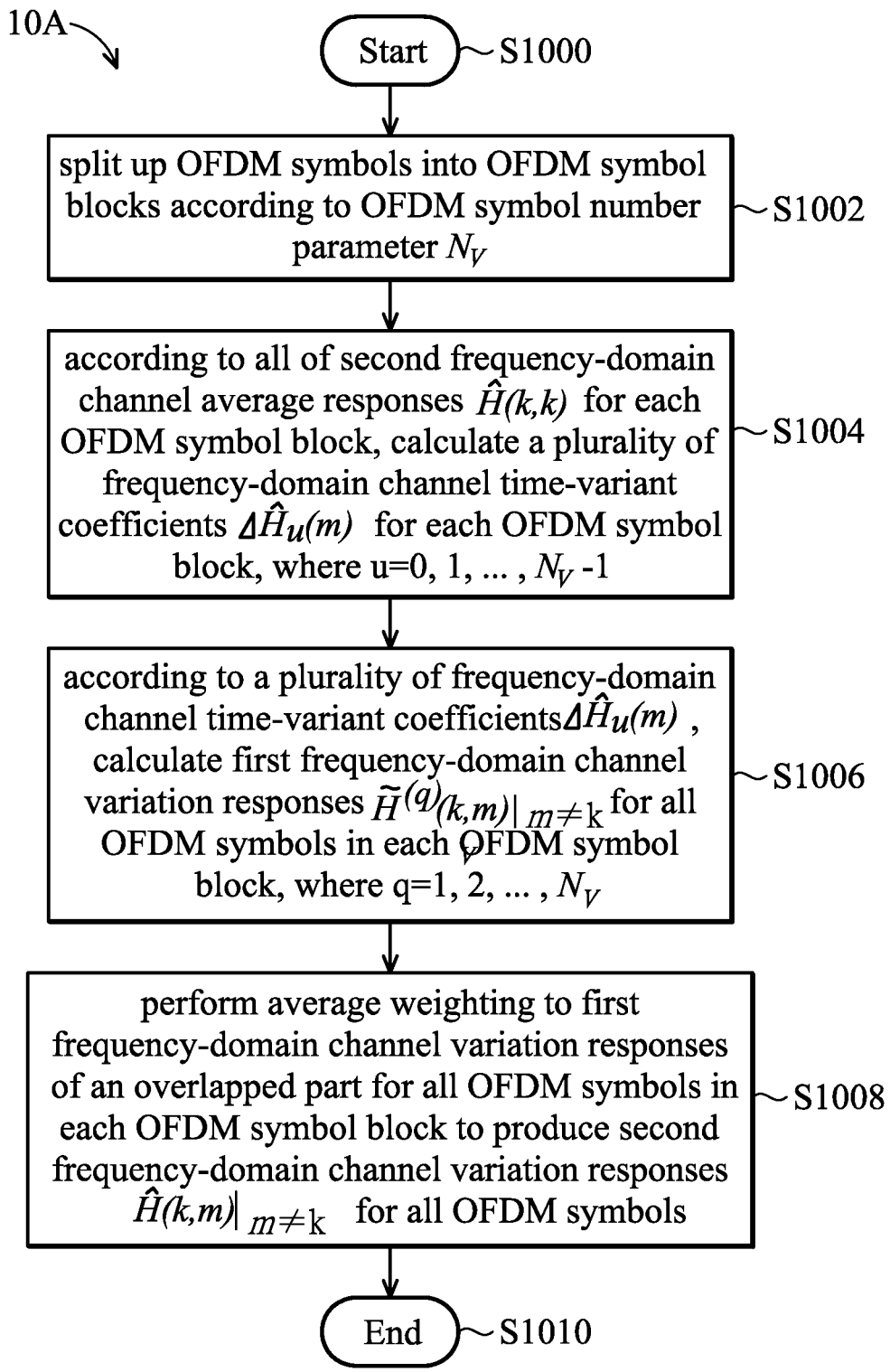
FIG. 10A is a flowchart of a frequency-domain channel variation response estimation method 10A according to an embodiment of the invention, incorporating the frequency-domain channel variation response estimation module 36 in FIG. 9.
Figure 10B:
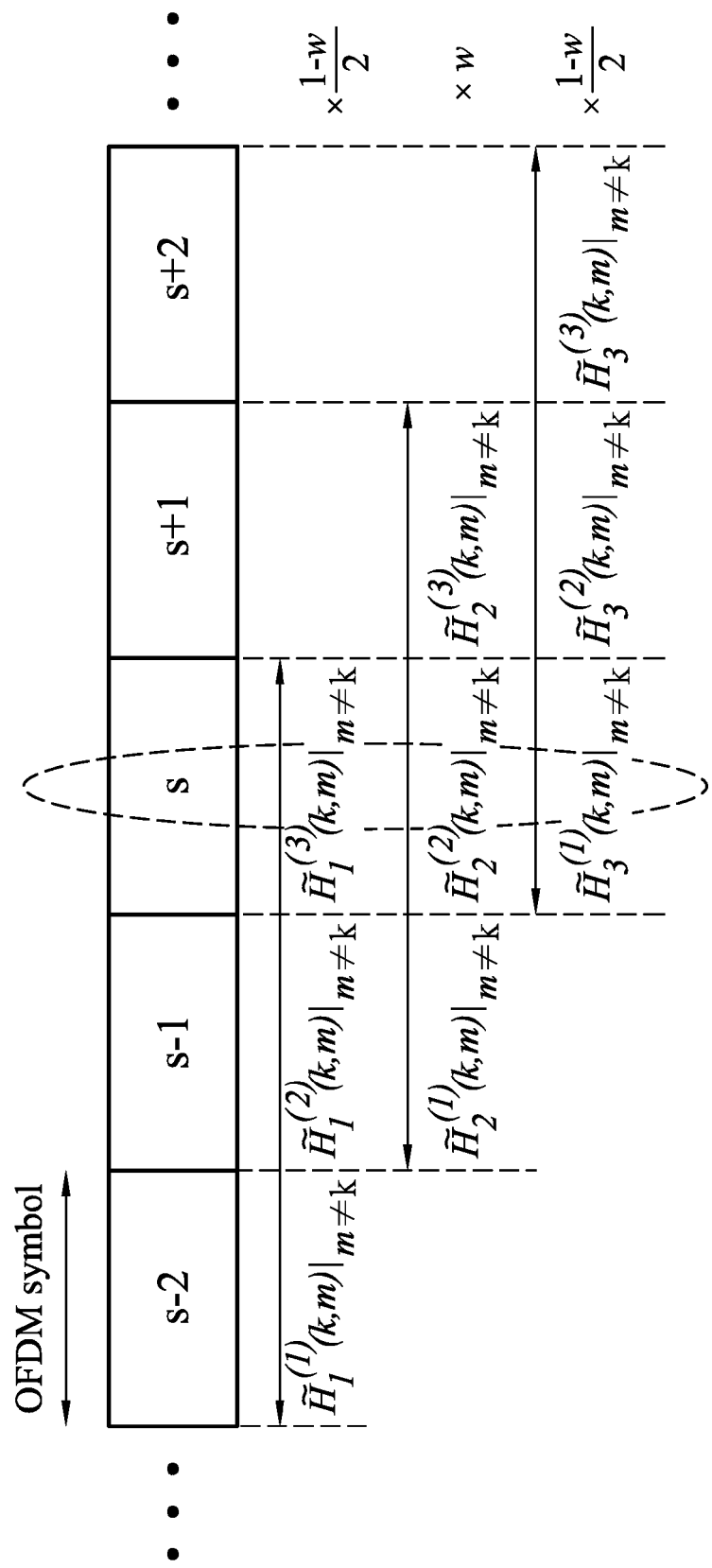
FIG. 10B is also provided to illustrate the operation of the method 10A.

FIG. 10A is a flowchart of a frequency-domain channel variation response estimation method 10A according to an embodiment of the invention, incorporating the frequency-domain channel variation response estimation module 36 in FIG. 9, FIG. 10B is also provided to illustrate the operation of the method 10A.

Upon startup of the frequency-domain channel variation response estimation method 10A, the frequency-domain channel variation response estimation module 36 initializes all parameters and devices used in the frequency-domain channel variation response estimation method 10A (S1000). The OFDM symbol block split module 900 can group each consecutive $N_v$ number of the OFDM symbols into one symbol block, wherein each symbol block may overlap with another, and adjacent blocks are spaced by 1 OFDM symbol (S 1002). The frequency-domain channel time-variant coefficient estimation module 902 can work out the frequency-domain channel time-variant coefficient $\Delta \hat{H}_u(m)$ for each block, where $u=0,1, \ldots, N_v-1$ (S1004). Taking $N_v=3$ as an example, the higher-order time-variant channel model such as a second-order time-variant model is implemented, the $q^{th}$ OFDM symbol in each block, the $n^{th}$ sampling time, and the channel response for the $l^{th}$ path in the time domain can be expressed as:

$$h_{n,l}^{(q)} = c_{0,l} + c_{1,l}n + c_{2,l}n^2, \text{ for } n = N_g + (q-1)N_x \sim N_g + (q-1)N_x + N - 1, q = 1,2,3 \quad \text{Eq. (5)}$$

Where $N_g$ represents guard interval duration;
$N_x$ represents OFDM symbol duration, $N_x = N + N_g$;
$C_{u,l}$ represents the time-domain channel time-variant coefficient, where $u=0, 1, 2$.

The frequency-domain channel time-variant coefficients for each block can be expressed by Eq. (6):

$$\Delta H_u(m) = \sum_{l=0}^{L-1} c_{u,l} e^{-j\frac{2\pi m \tau_l}{N}} = DFT(c_{u,l}), u = 0, 1, 2. \qquad \text{Eq. (6)}$$

The frequency-domain channel response for the qth OFDM symbol in each block can be expressed by Eq. (7):

$$H^{(q)}(k, m) = \sum_{l=0}^{L-1}\left[\frac{1}{N}\sum_{n=0}^{N-1} h_{n,l}^{(q)} e^{j\frac{2\pi n(m-k)}{N}}\right] e^{-j\frac{2\pi m \tau_l}{N}}, \qquad \text{Eq. (7)}$$

When $m = k$, $$H^{(q)}(k, k) = \Delta H_0(k) + \left[\frac{N-1}{2} + N_g + (q-1)N_x\right]\Delta H_1(k) + \qquad \text{Eq. (8)}$$
$$\frac{1}{N}\sum_{n=0}^{N-1}[n + N_g + (q-1)N_x]^2 \Delta H_2(k), q = 1, 2, 3.$$

Based on Eq. (8), the three equations $H^{(1)}(k,k)$, $H^{(2)}(k,k)$, and $H^{(3)}(k,k)$ may be formed, and using a linear combination of the three equations, the three unknown parameters $\Delta \hat{H}_u(k)$ may be calculated, where U=0, 1, 2. In other words, by utilizing the second frequency-domain channel average responses $\hat{H}^{(q)}(k,k)$ of the three OFDM symbols in the symbol block with q=1, 2, 3, the three frequency-domain channel time-variant coefficients $\Delta \hat{H}_u(m)$ for the symbol block may be calculated, where u=0, 1, 2.

The first frequency-domain channel variation response estimation module 904 can utilize frequency-domain channel time-variant coefficients of all blocks, by certain linear combination, the frequency-domain channel variation responses $\tilde{H}^{(q)}(k,m)|_{m \neq k}$ of all OFDM symbols can be worked out, where q=1, 2, ..., $N_v$, and $\tilde{H}^{(q)}(k,m)|_{m \neq k}$ is referred to as the first frequency-domain channel variation response (S 1006). The frequency domain channel response of the qth OFDM symbol in each symbol block can be expressed by Eq. (7), when $m \neq k$, $$\tilde{H}^{(q)}(k, m) = \beta_1^{(q)}(m - k)\Delta \hat{H}_1(m) + \beta_2^{(q)}(m - k)\Delta \hat{H}_2(m) \qquad (9)$$

$$\text{When } \beta_u(m - k)\frac{1}{N}\sum_{n=0}^{N-1} n^j e^{j\frac{2\pi n(m-k)}{N}}, \qquad (10)$$

$$\beta_1^{(q)}(m - k) = \beta_1(m - k), \qquad (11)$$

$$\beta_2^{(q)}(m - k) = \beta_2(m - k) + 2[N_g + (q-1)N_x]\beta_1(m - k) \qquad (12)$$

Eq. (9) through Eq. (12) can be used to calculate the frequency-domain channel variation responses $\tilde{H}^{(q)}(k,m)|_{m \neq k}$ of $N_v$ number of the OFDM symbols in each block by computing certain linear combinations with the $N_v$ number of the frequency-domain channel time-variant coefficients for each block, where q=1,2,..., $N_v$.

Lastly, the weighting average module 906 can perform a weighting average on all overlapped parts in all blocks to determine the frequency-domain channel variation response $\hat{H}(k,m)|_{m \neq k}$ for all OFDM symbols, with $\hat{H}(k,m)|_{m \neq k}$ being referred to as the second frequency-domain channel variation response (S 1008). FIG. 10B depicts the operation of performing the weighting average on the overlapped parts in the blocks, thereby deriving the frequency-domain channel variation responses $\hat{H}(k,m)|_{m \neq k}$ for all OFDM symbols. Based on the mathematical analysis and simulation, the weighting w for the middle OFDM symbol may be assigned as 0.61 in the case of $N_v=3$.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A communication method, configured to handle channel estimation by a communication device, comprising:
    receiving a time-domain OFDM symbol;
    converting the time-domain OFDM symbol to a frequency-domain OFDM symbol, wherein the frequency-domain OFDM symbol comprises a plurality of pilot sub-carrier received signals and a plurality of data sub-carriers received signals;
    extracting the plurality of pilot sub-carrier received signals from the converted frequency-domain OFDM symbol;
    estimating a plurality of first frequency-domain channel average responses corresponding to a plurality of pilot sub-carriers according to the extracted plurality of pilot sub-carrier received signals and a plurality of pilot sub-carrier transmitted signals;
    determining a pilot sub-carrier number parameter for a sub-carrier block according to a statistical information of channel delay;
    splitting all of the sub-carriers into a plurality of sub-carrier blocks according to the pilot sub-carrier number parameter; and
    estimating second frequency-domain channel average responses for all sub-carriers in the frequency-domain OFDM symbol according to first frequency-domain channel average responses of the pilot sub-carriers in all sub-carrier blocks.

2. The communication method of claim 1, wherein the estimating second frequency-domain channel average responses step comprises:
    performing a weighting average and interpolation on the first frequency-domain channel average responses of the plurality of pilot sub-carriers to estimate the second frequency-domain channel average responses of all sub-carriers in the frequency-domain OFDM symbol.

3. The communication method of claim 1, wherein the estimating second frequency-domain channel average responses step comprises:
    performing a weighting average according to the first frequency-domain channel average responses of the plurality of pilot sub-carriers in each sub-carrier block to obtain a weighting average value for each sub-carrier block; and
    performing interpolation according to the weighting average value for each sub-carrier block to estimate the second frequency-domain channel average responses of all sub-carriers.

4. The communication method of claim 1, wherein the estimating second frequency-domain channel average responses step comprises:
- performing an interpolation according to the first frequency-domain channel average responses of the plurality of pilot sub-carriers in each sub-carrier block to obtain the first frequency-domain channel average responses of all sub-carriers in each sub-carrier block; and
- performing a weighting average according to the first frequency-domain channel average responses of an overlapped part of all sub-carriers in each sub-carrier block to estimate the second frequency-domain channel average responses of all sub-carriers in the frequency-domain OFDM symbol.

5. The communication method of claim 1, further comprising:
- determining an OFDM symbol number parameter of an OFDM symbol block according to a motion speed of the communication device;
- splitting the frequency-domain OFDM symbols into the OFDM symbol block according to the OFDM symbol number parameter;
- calculating a plurality of frequency-domain channel time-variant coefficients for each OFDM symbol block according to the second frequency-domain channel average responses of all frequency-domain OFDM symbols in each OFDM symbol block;
- calculating the first frequency-domain channel variation responses of all frequency-domain OFDM symbols in the OFDM symbol block according to the plurality of frequency-domain channel time-variant coefficients; and
- performing a weighting average on a first frequency-domain channel variation responses of the overlapped part of all frequency-domain OFDM symbols in each OFDM symbol block to estimate the second frequency-domain channel variation responses of all frequency-domain OFDM symbols.

6. The communication method of claim 5, further comprises:
- reducing inter-sub-carrier interference of a time-variant channel effect according to the second frequency-domain channel variation responses.

7. A communication device, providing channel estimation, comprising:
- a receiver module, configured to receive a time-domain OFDM symbol;
- a Fourier transform module, configured to convert the time-domain OFDM symbol to a frequency-domain OFDM symbol, where the frequency-domain OFDM symbol comprises a plurality of pilot sub-carrier received signals and a plurality data sub-carrier received signals;
- a pilot sub-carrier extraction module, configured to extract the plurality of pilot sub-carrier received signals from the converted frequency-domain OFDM symbol;
- a first frequency-domain channel average response estimation module, configured to estimate a plurality of first frequency-domain channel average responses corresponding to a plurality of pilot sub-carriers according to the extracted plurality of pilot sub-carrier received signals and a plurality of pilot sub-carrier transmitted signals;
- a sub-carrier block size determination module, configured to determine a pilot sub-carrier number parameter for a sub-carrier block according to a statistical information of channel delay;
- a sub-carrier block split module, configured to split all of the sub-carriers into a plurality of sub-carrier blocks according to the pilot sub-carrier number parameter; and
- a second frequency-domain channel average response estimation module, configured to estimate second frequency-domain channel average responses of all sub-carriers in the frequency-domain OFDM symbol according to first frequency-domain channel average responses of the pilot sub-carriers in all sub-carrier blocks.

8. The communication device of claim 7, wherein the second frequency-domain channel average response estimation module is configured to estimate second frequency-domain channel average responses by performing a weighting average and interpolation on the first frequency-domain channel average responses of the plurality of pilot sub-carriers to estimate the second frequency-domain channel average responses of all sub-carriers in the frequency-domain OFDM symbol.

9. The communication device of claim 7, wherein the second frequency-domain channel average response estimation module is configured to estimate second frequency-domain channel average responses by:
- performing a weighting average according to the first frequency-domain channel average responses of the plurality of pilot sub-carriers in each sub-carrier block to obtain a weighting average value for each sub-carrier block; and
- performing interpolation according to the weighting average value for each sub-carrier block to estimate the second frequency-domain channel average responses of all sub-carriers.

10. The communication device of claim 7, wherein the second frequency-domain channel average response estimation module is configured to estimate second frequency-domain channel average responses by:
- performing an interpolation according to the first frequency-domain channel average responses of the plurality of pilot sub-carriers in each sub-carrier block to obtain the first frequency-domain channel average responses of all sub-carriers in each sub-carrier block; and
- performing a weighting average according to the first frequency-domain channel average responses of an overlapped part of all sub-carriers in each sub-carrier block to estimate the second frequency-domain channel average responses of all sub-carriers in the frequency-domain OFDM symbol.

11. The communication device of claim 7, further comprising:
- an OFDM symbol block size determination module, configured to determine an OFDM symbol number parameter of an OFDM symbol block according to a motion speed of the communication device;
- an OFDM symbol block split module, configured to split the frequency-domain OFDM symbols into the OFDM symbol block according to the OFDM symbol number parameter;
- a frequency-domain channel time-variant coefficient estimation module, configured to calculate a plurality of frequency-domain channel time-variant coefficients for each OFDM symbol block according to the second frequency-domain channel average responses of all frequency-domain OFDM symbol in each OFDM symbol block;

a frequency-domain channel variation response estimation module, configured to calculate first frequency-domain channel variation response of all frequency-domain OFDM symbols in the OFDM symbol block according to the plurality of frequency-domain channel time-variant coefficients; and a second frequency-domain channel variation response estimation module, configured to perform a weighting average on a first frequency-domain channel variation responses of an overlapped part of all frequency-domain OFDM symbols in each OFDM symbol block to estimate the second frequency-domain channel variation responses of all frequency-domain OFDM symbols.

12. The communication device of claim 11 further comprises:

An equalizer, configured to reduce inter-sub-carrier interference of a time-variant channel effect according to the second frequency-domain channel variation responses.

* * * * *